United States Patent
Horesh et al.

(10) Patent No.: US 9,651,929 B2
(45) Date of Patent: May 16, 2017

(54) HVAC SYSTEM CONTROL INTEGRATED WITH DEMAND RESPONSE, ON-SITE ENERGY STORAGE SYSTEM AND ON-SITE ENERGY GENERATION SYSTEM

(71) Applicant: International Business Machines Corporation, Armonk, NY (US)

(72) Inventors: Raya Horesh, North Salem, NY (US); Young M. Lee, Old Westbury, NY (US); Leo S. Liberti, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 14/500,190

(22) Filed: Sep. 29, 2014

(65) Prior Publication Data
US 2016/0091904 A1  Mar. 31, 2016

(51) Int. Cl.
G05B 17/02 (2006.01)
G05D 23/19 (2006.01)
(Continued)

(52) U.S. Cl.
CPC .......... *G05B 17/02* (2013.01); *F24F 11/0012* (2013.01); *F24F 11/0034* (2013.01);
(Continued)

(58) Field of Classification Search
CPC ...... F24F 11/012; F24F 11/0034; F24F 11/06; F24F 2011/0046; F24F 2011/0047;
(Continued)

(56) References Cited

U.S. PATENT DOCUMENTS 8,078,330 B2 * 12/2011 Brickfield ............... H02J 3/008
700/286
8,099,198 B2   1/2012 Gurin
(Continued)

OTHER PUBLICATIONS

Wilcox, S., et al., "Users Manual for TMY3 Data Sets", Technical Report NREL/TP-581-43156, National Renewable Energy Laboratory, Revised May 2008, 3 pages.
(Continued)

*Primary Examiner* — Crystal J Barnes-Bullock
(74) *Attorney, Agent, or Firm* — Scully, Scott, Murphy & Presser, P.C.; Daniel P. Morris, Esq.

(57) ABSTRACT

A thermal behavior model of a building may be constructed based on time series data. Based on the constructed thermal behavior model, forecasted zone temperature and energy usage for a next control time period may be predicted. An objective function may be constructed based on at least a dynamically priced grid energy cost, occupant comfort matrix, and one or more of: energy storage system cost and associated operational cost, and energy generation system cost and associated green house emission cost and associated operational cost. Constraints may be constructed based on at least the forecasted zone temperature values and energy usage values for the next control time period. A control profile of the HVAC system and sourcing decision of energy load of the HVAC system may be determined simultaneously based on the objective function and the plurality of constraints.

20 Claims, 9 Drawing Sheets

(51) Int. Cl.
*G05B 15/02* (2006.01)
*G05B 13/02* (2006.01)
*F24F 11/00* (2006.01)
*G05B 13/04* (2006.01)
*G06Q 50/06* (2012.01)
*H02J 3/00* (2006.01)

(52) U.S. Cl.
CPC ............ *G05B 13/02* (2013.01); *G05B 13/04* (2013.01); *G05B 15/02* (2013.01); *G05D 23/1904* (2013.01); *G05D 23/1917* (2013.01); *G05D 23/1923* (2013.01); *G06Q 50/06* (2013.01); *F24F 2011/0047* (2013.01); *F24F 2011/0058* (2013.01); *H02J 2003/003* (2013.01); *H02J 2003/007* (2013.01); *Y02P 80/11* (2015.11)

(58) Field of Classification Search
CPC ....... F24F 2011/0058; F24F 2011/0063; F24F 2011/0064; F24F 2011/0075; G05B 13/02; G05B 13/0205; G05B 13/024; G05B 13/04; G05B 13/048; G05B 15/02; G05B 17/02; G05B 2219/2614; G05B 2219/2642; G05F 1/66; Y02P 80/11; G06Q 10/04; G06Q 30/02; G06Q 30/0283; G06Q 50/06; H02J 2003/003; H02J 2003/007
See application file for complete search history.

(56) References Cited

U.S. PATENT DOCUMENTS

| | | | | |
|---|---|---|---|---|
| 8,359,124 | B2* | 1/2013 | Zhou | G05B 13/024 700/276 |
| 8,755,943 | B2 | 6/2014 | Wenzel | |
| 9,098,876 | B2* | 8/2015 | Steven | G06Q 30/0283 |
| 9,134,353 | B2* | 9/2015 | Jia | G06Q 40/04 |
| 9,244,444 | B2* | 1/2016 | Carty | G05B 15/02 |
| 2010/0076835 | A1* | 3/2010 | Silverman | G06Q 10/06 705/14.33 |
| 2010/0217550 | A1* | 8/2010 | Crabtree | H02J 3/005 702/62 |
| 2012/0215369 | A1 | 8/2012 | Desai et al. | |
| 2012/0259469 | A1 | 10/2012 | Ward et al. | |
| 2013/0013121 | A1 | 1/2013 | Henze et al. | |
| 2013/0151013 | A1 | 6/2013 | Nikovski et al. | |
| 2013/0245847 | A1 | 9/2013 | Steven et al. | |
| 2014/0018971 | A1 | 1/2014 | Ellis et al. | |
| 2014/0222665 | A1 | 8/2014 | Kamel et al. | |
| 2015/0012144 | A1* | 1/2015 | Wang | H02J 3/00 700/291 |
| 2015/0248118 | A1* | 9/2015 | Li | G05B 13/04 700/295 |
| 2015/0253027 | A1* | 9/2015 | Lu | F24F 11/006 700/276 |
| 2016/0305678 | A1* | 10/2016 | Pavlovski | F24F 11/006 |

OTHER PUBLICATIONS

"Prosumer Microgrid Solutions", Prosumer Energy Storage (Schneider Electric Inc.), printed on Nov. 7, 2014, 3 pages, http://www2.schneider-electric.com/sites/corporate/en/products-services/smart-grid-solutions/prosumer-microgrid-solutions/overview.page.

Demand Energy Network Inc., "Commercial and Industrial Buildings", printed on Nov. 7, 2014, 3 pages, http://www.demand-energy.com/applications/commercial-buildings-industrial-complexes-energy-storage.

Zavala, V.M., et al., "Next-Generation Building Energy Management Systems and Implications for Electricity Markets", Mathematics and Computer Science Division, Technical Memorandum ANL/MCS-TM-315, Jul. 2011, 14 pages.

Zavala, V.M., et al., "Techno-Economic Evaluation of a Next-Generation Building Energy Management System", Mathematics and Computer Science Division, Technical Memorandum ANL/MCS-TM-313, May 2011, 27 pages.

Pruitt, K. A., et al., "A mixed-integer nonlinear program for the optimal design and dispatch of distributed generation systems", Optim. Eng., Published online Aug. 17, 2013, 31 pages, Springer Science+Business Media, New York.

Kusiak, A., et al., "Modeling and optimization of HVAC systems using a dynamic neural network", Energy 42, Available online Apr. 27, 2012, pp. 241-250.

Braun, J. E., et al., "Evaluating the Performance of Building Thermal Mass Control Strategies", HVAC&R Research, Oct. 2001, pp. 403-428, vol. 7, No. 4.

Braun, J. E., "Reducing Energy Costs and Peak Electrical Demand through Optimal Control of Building Thermal Storage", ASHRAE Transactions, Jun. 10-13, 1990, pp. 876-888, 96(2).

Chicco, G. et al., "Distributed multi-generation: a comprehensive view", Renewable and Sustainable Energy Reviews 13, accepted Nov. 7, 2009, pp. 535-551.

* cited by examiner

HVAC SYSTEM CONTROL INTEGRATED WITH DEMAND RESPONSE, ON-SITE ENERGY STORAGE SYSTEM AND ON-SITE ENERGY GENERATION SYSTEM

FIELD

The present application relates generally to buildings and energy consumption, and more particularly to control systems and controlling Heating Ventilation and Air Conditioning (HVAC) systems.

BACKGROUND

Buildings such as commercial and residential buildings consume a large amount of energy, and approximately half of the energy consumption is taken up by Heating Ventilation and Air Conditioning (HVAC) systems in the buildings. A traditional approach to optimized HVAC control in a building is to compute an optimal control profile (e.g., a set point profile of each heating and/or cooling zone, supply flow rate or supply temperature of air handling unit (AHU)) that minimizes the total energy consumption while satisfying thermal comfort (e.g., zone temperature and humidity) and physical limitations of HVAC equipment (e.g., supply temperature, supply flow rate of AHU). Such traditional approaches typically assume that the electricity price is constant throughput the day.

Another known approach develops an HVAC control method that minimizes the total energy costs considering demand response signal (e.g., dynamic, time of day pricing of electricity) while satisfying thermal comfort, and an example of such method is a commercial product called BuildingIQ. However, that approach does not decide how the load of HVAC system resulting from the optimized control is optimally sourced through energy supplies, e.g., grid electricity with demand response, on-site stored electricity (e.g., lead acid battery) and on-site generated electricity (e.g., combined heat and power (CHP) generator).

BRIEF SUMMARY

A method of controlling an HVAC system, in one aspect, may comprise receiving a time series data of at least a zone temperature associated with a building zone, energy usage associated with the building zone, building operations associated with the building zone and ambient temperature. At least some of the time series data may be received from a building automation controller that is connected to one or more sensors and/or one or more meters in a building. The method may also comprise constructing a thermal behavior model of the building zone based on the time series data. The method may further comprise predicting based on the constructed thermal behavior model at least forecasted zone temperature values and energy usage values for a next control time period. The method may also comprise constructing an objective function based on at least a dynamically priced grid energy cost, occupant comfort matrix, and one or more of: energy storage system cost and associated operational cost, and energy generation system cost and associated green house emission cost and associated operational cost. The method may further comprise constructing a plurality of constraints based on at least the forecasted zone temperature values and energy usage values for the next control time period. The method may also comprise determining a control profile of the HVAC system and sourcing decision of energy load of the HVAC system simultaneously based on the objective function and the plurality of constraints. The method may further comprise transmitting the control profile to the building automation controller for controlling the HVAC system in accordance with the control profile. The method described herein may be used for controlling HVAC systems in commercial buildings, residential building and other types of buildings such as hospital, schools, warehouses, airports and hotels.

A system for controlling an HVAC system, in one aspect, may comprise at least one processor. A processor may be operable to receive a time series data of at least a zone temperature associated with a building zone, energy usage associated with the building zone, building operations associated with the building zone and ambient temperature. The processor may be operable to receive at least some of the time series data from a building automation controller that is connected to one or more sensors and/or one or more meters in a building. The processor may be further operable to construct a thermal behavior model of the building zone based on the time series data. The processor may be further operable to predict based on the constructed thermal behavior model at least forecasted zone temperature values and energy usage values for a next control time period. The processor may be further operable to construct an objective function based on at least a dynamically priced grid energy cost, occupant comfort matrix, and one or more of (i) energy storage system cost and associated operational cost, and (ii) energy generation system cost and associated green house emission cost and associated operational cost. The processor may be further operable to construct a plurality of constraints based on at least the forecasted zone temperature values and energy usage values for the next control time period. The processor may be further operable to determine a control profile of the HVAC system and sourcing decision of energy load of the HVAC system simultaneously based on the objective function and the plurality of constraints. The processor may be further operable to transmit the control profile to the building automation controller for controlling the HVAC system in accordance with the control profile. The processor may be used for controlling HVAC systems in commercial buildings, residential building and other types of buildings such as hospital, schools, warehouses, airports and hotels.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
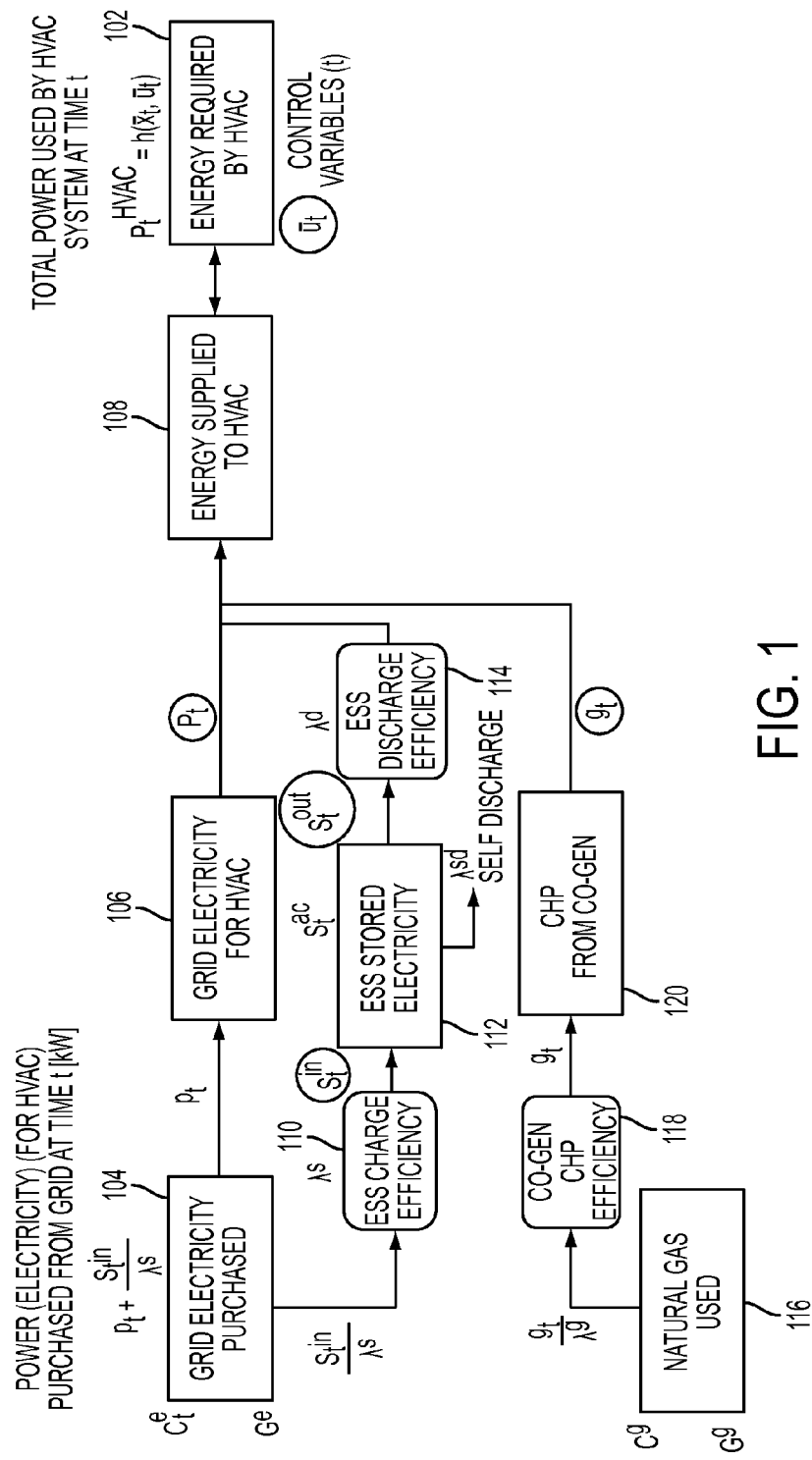
FIG. 1 is a diagram illustrating an optimized demand response control of HVAC system with on-site energy storage system and on-site energy generation system in one embodiment of the present disclosure.

A method and computer system may be presented that in one embodiment compute control profiles of an HVAC system as well as how the power (load) needed by the HVAC system is optimally sourced through optimized combination of grid purchased energy with demand response, on-site stored energy and on-site generated energy. In one aspect, the control profiles are optimal. The control profile is then communicated to the controller (e.g., a Building Automation System) to control the HVAC system. In one embodiment, the method includes a Model Predictive Control (MPC) framework for a building HVAC control that reduces energy costs of HVAC operations proactively using an optimal control method and considering the dynamic price of grid purchased electricity, on-site stored electricity, and/or on-site generated electricity. The method and/or computer system can serve as an energy reduction and demand response tool that not only optimize the energy costs in buildings but also reduce energy production, stabilize energy supply (grid), and promote smart grid.

In one embodiment, the method and/or computer system of the present disclosure may compute optimal control profile of HVAC system that minimizes the total energy costs and green house gas (GHG) emission considering, e.g., (1) demand response signal, (2) on-site energy storage system (3) on-site energy generation system, while at the same time, satisfying thermal comfort (e.g., zone temperature and humidity), physical limitations of HVAC equipment and physical limitations of one or more energy storage systems (ESS) and one or more energy generators. For example, the method and/or computer system of the present disclosure may optimally compute how much electricity to generate and/or store and when or at what time (e.g., when cost or price is low) and compute how much of the stored or generated electricity or grid purchased electricity to use and when or at what time for operations of an HVAC system. For instance, in addition to using the grid purchased electricity which may be priced dynamically, e.g., based on demand and supply, the method and/or computer system of the present disclosure may also determine how much of the stored and/or generated electricity to use and when to use the stored and/or generated electricity. The method and/or computer system of the present disclosure may power the HVAC system from the optimal combination of grid electricity, on-site stored electricity and on-site generated electricity.

In one aspect, using a predictive model that predicts HVAC energy demand at various times, weather conditions and operational situations in a building (e.g., whether the building or a zone of the building is in operation or not), the method and/or computer system of the present disclosure in one embodiment compute how energy demand should be changed as well as how much energy from the storage should be used, how much energy to store simultaneously and how much energy to generate on-site and use it for HVAC operation.

In another aspect, the method and/or computer system of the present disclosure in one embodiment source the load of optimized HVAC control profile (control variable values over time) through an optimized combination of on-site energy storage (e.g., lead acid battery etc.) or on-site generation (e.g., CHP generator) along with demand response responded grid purchased energy.

The method and/or computer system of the present disclosure in one embodiment determine how the load of an HVAC system resulting from an optimized control is optimally sourced through energy supplies, e.g., grid electricity with demand response, on-site stored electricity (e.g., lead acid battery) and on-site generated electricity (e.g., CHP generator). In another aspect, the method and/or computer system of the present disclosure in one embodiment may allow for generating and storing energy at anytime (e.g., when price or cost is low) and using it at anytime for operations of HVAC system.

A Model Predictive Control (MPC) method in the present disclosure in one embodiment may model or describe the thermal behavior of zones (i.e., spaces) in a building by using two sets of equations. The one equation is the equation of state variables:

$$\frac{dx(t)}{dt} = f(x(t), u(t)) \quad (1)$$

The thermal behavior can also be represented by algebraic expression as $$x_t = f(x_{t-1}, x_{t-2}, \ldots, u_t, u_{t-1}, u_{t-2}, \ldots) \quad (2)$$

Here, $x_t$ is the value of state variable x at time t, and $u_t$ is the value of control variables u at time t. The equations (1) and (2) describe that the state variable values for a time period of interest depend on the state variable values in the previous time periods and control variable values at the time of interest as well as the previous time periods. The state variable and control variable are vectors, and include multiple components. Examples of the state variable include zone temperature of zone z at time t, $T_{t,z}^{zone}$, day of the week (DOW), time of the day (TOD) and ambient temperature, $T_t^{amb}$. Examples of the control variables include $T_{t,z}^{sp}$, set point of zone z and time t, $T_{t,z}^{sys}$, supply temperature of air handling unit (AHU) at zone z, and $\dot{m}_{t,z}^{sys}$, supply flow rate of air handling unit (AHU) at zone z. For the example of state variable $T_{t,z}^{zone}$ and control variable $T_{t,z}^{sp}$, the example state variable equation (2) becomes $$T_{t,z}^{zone} = f(T_{t-1,z}^{zone}, T_{t-2,z}^{zone}, \ldots, \bar{x}_t, \bar{x}_{t-1}, \bar{x}_{t-2}, \ldots, T_{t,z}^{sp}, T_{t-1,z}^{sp}, T_{t-2,z}^{sp}, \ldots) \quad (3)$$

where $\bar{x}$ are vectors of other state variables such as day of the week (DOW), time of the day (TOD) and ambient temperature, $T_t^{amb}$. Equations (1)-(3) are referred to as equations of system state.

Another set of equations that describe the thermal phenomena of zones in a building is the equations of system output:

$$y_t = h(y_{t-1}, y_{t-2}, \ldots, x_t, x_{t-1}, x_{t-2}, \ldots, u_t, u_{t-1}, u_{t-2}, \ldots) \quad (4)$$

Here, $y_t$ is the value of system output variable y at time t. An example of system output variable is $P_{t,z}^{HVAC}$, power consumption of HVAC system for zone z at time t. For the example of state variable $T_{t,z}^{zone}$ and control variable $T_{t,z}^{sp}$, output variable can be $P_{t,z}^{HVAC}$, and the example system output equation (3) becomes $$P_{t,z}^{HVAC} = h(P_{t-1,z}^{HVAC}, P_{t-2,z}^{HVAC}, \ldots, T_{t,z}^{zone}, T_{t-1,z}^{zone}, T_{t-2,z}^{zone}, \ldots, \bar{x}_t, \bar{x}_{t-1}, \bar{x}_{t-2}, \ldots, T_{t,z}^{sp}, T_{t-1,z}^{sp}, T_{t-2,z}^{sp}, \ldots) \quad (5)$$

An example method for modeling the thermal behavior (equation 2 and 3) of the building zone is artificial neural network modeling. As HVAC system behavior is dynamic and non-linear, a non-linear autoregressive with external input (NARX) data driven model can capture its properties and states. NARX is a feed-forward time delay neural network, which maps input data to an output, with additional external input (see FIG. 7). The NARX network includes three layers: input layer, hidden layer and output layer. However, deep NARX network, with multiple hidden layers can also be considered. The choice of the activation function influences the optimization scheme. The methodology of the present disclosure may consider three types of activation functions: hyperbolic tangent, symmetric saturated liner transfer function and hard-limit transfer function. Choosing the first transfer function (hyperbolic tangent) results in Mixed-Integer Non-Linear Programming (MINLP) problem, while choosing the other two function (symmetric saturated liner transfer function and hard-limit transfer function) results in Mixed-Integer Linear Programming (MILP) problem. The latter is easier to solve. In one embodiment of the present disclosure, the neural network is trained on historic time-series data (e.g., few weeks' time series data). The entire dataset for neural network training may be randomly divided into three contiguous blocks: training, validation and testing.

This network results in the following algebraic equation:

$$y(t) = TF_2[W_3 \cdot TF_1\{W_1 \cdot (x(t), x(t-1), \ldots, x(t-d_1)) + W_2 \cdot (y(t-1), \ldots, y(t-d_2)) + b_1\} + b_2] \quad (6)$$

where $W_1$, $W_2$, $W_3$ are weight matrices, $b_1$, $b_2$ are biases, $d_1$, $d_2$ are network time delays and $TF_1$, $TF_2$ are transfer functions, of which $TF_2$ may be chosen to be linear. x(t) is the network input (e.g., an array of input) at time t and y(t) is the network output (e.g., zone temperature or power).

In one embodiment of the present disclosure, an optimal control modeling may be described by the following equations:

Compute the Optimal Control Profile, $u^*(\tau)$ $$\min g(x, u) = \int_{t_k}^{t_k+T} \varphi(x(\tau), u(\tau)) d\tau \quad (7)$$

$$\varphi(x(\tau), u(\tau)) := \alpha_1(EnergyCost) + \alpha_2(GHG\_Cost) + \alpha_3(Comfort) + \ldots$$

$$\text{s.t.} \frac{dx(\tau)}{dt} = f(x, u), \text{ or } f(x, u) = 0$$

-continued $$h(x, u) = 0,$$

$$x^L \le x \le x^H,$$

$$u^L \le u \le u^H,$$

other constraints (physical limitations).

In the above equation (7), L represents lower bound, H represents upper bound, g represents an overall objective function, $\varphi$ represents an objective function value at certain time, $\tau$ represents t or time, f represents an equation of system state, h represents an equation of system output (e.g., power), k represents an arbitrary index value to indicate time.

A method for modeling the optimal control problem in one embodiment may be formulated as an objective function and a set of constraints. The following describes the notations, the objective function and the set of constraints in one embodiment:

Indices and sets:
t∈T: Time periods
z∈Z: Zones
  Decision Variables:
$p_t$ Power (electricity) (for HVAC) purchased from grid at time t [kW]
$g_t$ Power of CHP generated by generator at time t [kW]
$s_t^{in}$ Power charged by ESS at time t [kW]
$s_t^{out}$ Power discharged from ESS at time t [kW]
$s_t^{ac}$ Total amount of energy stored in the ESS at time t [kWh]
$P_{t,z}^{HVAC}$ Total power used by HVAC system at time t for zone z [kW]
$u_t$ Binary variable, on/off status of generator at time t
$v_t$ Binary variable, on/off status of ESS at time t
$T_{t,z}^{Zone}$ Zone temperature at time t [° C.]
$T_{t,z}^{sp}$ Zone set point at time t [° C.] (Control Variable)
  Parameters:
$C_t^e$ Cost of grid purchased electricity at time t [$/kW for one hour]:
$C^g$ Cost of natural gas purchased [$/GJ or $/kWh]:
$G^e$ GHG emission rate of grid purchased electricity (source) at time t [kg CO2e/kWh]
$G^g$ GHG emission rate of natural gas purchased (source) [kg CO2e/kWh]
$\lambda^s$ Efficiency of energy charged to ESS
$\lambda^d$ Efficiency of energy discharged from ESS
$\lambda^{sd}$ Rate of energy self-discharged from ESS [%]
$\lambda^g$ Efficiency of CHP co-gen
$\alpha_1$ Weight of cost in the objective function: e.g., 1
$\alpha_2$ Weight of emission in the objective function: e.g., 5
$\alpha_3$ Weight of comfort in the objective function: e.g., 2
$\alpha_4$ Weight of EGS operational cost in the objective function: e.g., 1
$\alpha_5$ Weight of ESS operational cost in the objective function: e.g., 1
$g^{max}$, $g^{min}$ Maximum and minimum generation amount [kW]
$s^{in,max}$, $s^{in,min}$ Maximum and minimum storage (charge) rate in unit time [kW]
$s^{out,max}$, $s^{out,max}$ Maximum and minimum discharge rate in unit time [kW]
$s^{ac,max}$, $s^{ac,min}$ Maximum and minimum total storage amount [kWh]
$\delta$ Time unit (to convert power (kW) to energy (kWh), [hr]
$r_t^{up}$ Max ramp-up rate of generator [kW/hr]
$r_t^{down}$ Max ramp-down rate of generator [kW/hr]
$T_{t,z}^{zone*}$ Target zone temperature of time t in zone z [° C.]
$S_t^g$ Startup cost (capital) of generator
$S_t^s$ Startup cost (capital) of storage system Objective Function:

$$\min_{p_t, s_t^{in}, s_t^{out}, g_t, T_{t,z}^{sp}} \sum_{t \in T} \left[ \alpha_1 \left\{ C_t^e \left( p_t + \frac{s_{in}}{\lambda^s} \right) + C^g \frac{g_t}{\lambda^g} \right\} + \alpha_2 \left\{ G^e \left( p_t + \frac{s_{in}}{\lambda^s} \right) + G^g \frac{g_t}{\lambda^g} \right\} + \alpha_3 \sum_{z \in Z} \frac{\|T_{t,z}^{zone*} - f(\cdot)\|^2}{2} + \alpha_4 S_t^g \mu_t + \alpha_5 S_t^s \nu_t \right]$$ (8)

Constraints:

$$T_{t,z}^{zone} = f(T_{t-1,z}^{zone}, T_{t-2,z}^{zone}, \ldots, \bar{x}_{t-1}, \bar{x}_{t-2}, \ldots, T_{t,z}^{sp}, T_{t-1,z}^{sp}, T_{t-2,z}^{sp}, \ldots), \quad \forall t \in T, z \in Z$$ (9)

$$P_{t,z}^{HVAC} = h(P_{t-1,z}^{HVAC}, P_{t-2,z}^{HVAC}, \ldots, T_{t,z}^{zone}, T_{t-1,z}^{zone}, T_{t-2,z}^{zone}, \ldots, \bar{x}_{t-1}, \bar{x}_{t-2}, \ldots, T_{t,z}^{sp}, T_{t-1,z}^{sp}, T_{t-2,z}^{sp}, \ldots), \quad \forall t \in T, z \in Z$$ (10)

$$\sum_{z \in Z} P_{t,z}^{HVAC} = p_t \quad \text{(example shown in FIG. 2)} \quad \forall t \in \{1, \ldots, T\}$$ (11)

$$\sum_{z \in Z} P_{t,z}^{HVAC} = p_t + s_t^{out} \lambda^d \quad \text{(example shown in FIG. 3)} \quad \forall t \in \{1, \ldots, T\}$$ (12)

$$\sum_{z \in Z} P_{t,z}^{HVAC} = p_t + g_t \quad \text{(example shown in FIG. 4)} \quad \forall t \in \{1, \ldots, T\}$$ (13)

$$\sum_{z \in Z} P_{t,z}^{HVAC} = p_t + s_t^{out} \lambda^d + g_t \quad \text{(example shown in FIG. 1)} \quad \forall t \in \{1, \ldots, T\}$$ (14)

$$T_{t,z}^{zone,L} \leq T_{t,z}^{zone} \leq T_{t,z}^{zone,H} \quad \forall t \in \{t_L \leq t \leq t_H\}$$ (15)

where $T_{t,z}^{zone,L}$ is a lower bound for $T_{t,z}^{zone}$ and $T_{t,z}^{zone,H}$ is an upper bound for $T_{t,z}^{zone}$, and $t_L$ is a lower boundary of building operating time (e.g., hour) and $t_H$ is an upper boundary of building operating time (e.g., hour)

Co-gen (for scenario 3 and 4)

$$g^{min} \cdot u_t \leq g_t \leq g^{max} \cdot u_t$$ (16)

$$-\delta r_t^{down} \leq g_{t+1} - g_t \leq \delta r_t^{up}$$ (17)

$$u_t \in \{0,1\}, g_t \geq 0,$$ (18)

ESS (for Scenario 2 and 4)

$$s_t^{ac} = [s_{t-1}^{ac} + \delta(s_t^{in} - s_t^{out})](1 - \lambda_t^{sd})$$ (19)

$$\delta s_t^{out} \leq s_t^{ac}$$ (20)

$$s^{in,min} \cdot v_t \leq s_t^{in} \leq s^{in,max} \cdot v_t$$ (21)

$$s^{out,min} \cdot v_t \leq s_t^{out} \leq s^{out,max} \cdot v_t$$ (22)

$$s^{ac,min} \leq s_t^{ac} \leq s^{ac,max}$$ (23)

$$v_t \in \{0,1\}, s_t^{in} \geq 0, s_t^{out} \geq 0$$ (24)

In this optimal control method, the method and/or computer system of the present disclosure in one embodiment determine a profile of a control variable, e.g., $T_{t,z}^{sp}$, set point of zone z and time t for a future period (e.g., next 24 hours) that minimizes total energy costs of operating HVAC system subject to thermal behavior (Eq. 9 and 10) inside a zone in a building, energy balance (Eq. 11, 12, 13 and 14) in a zone, and physical limitations of equipments, e.g., on-site energy storage equipment (Eq. 19, 20, 21, 22, 23 and 24) and on-site energy generation equipment (Eq. 16, 17 and 18). The control profile can also be of $T_{t,z}^{sys}$, supply temperature of air handling unit (AHU) at zone z, and $\dot{m}_{t,z}^{sys}$, supply flow rate of air handling unit (AHU) at zone z. The total cost (i.e., objective function) includes but is not limited to the costs related to energy usage, greenhouse gas emission deviation from comfort temperature range for building occupants and operational costs of on-site operating energy storage system and on-site energy generation system.

The method and/or computer system of the present disclosure in one embodiment may determine a profile of a variable (e.g., control variable) for one or more zones. A profile may be determined for each of multiple zones, if multiple zones are considered, simultaneously using an objective function and associated constraints. For instance, multiple profiles may be determined simultaneously.

Constraints of equations (9) and (10) describe thermal behavior inside a zone in a building. Constraints of equations (11)-(14) describe energy balance, i.e., the total used energy is equal to the sum of the sourced energy.

Constraints of equations (16)-(18) are associated with energy generation. The constraint of equation (16) describes that energy generation amount is bounded by a minimum and a maximum value. The minimum and maximum values may be given, e.g., by a manufacturer of an energy generator. The constraint of equation (17) describes that a change is the amount of generated energy from a time period to the next time period is bounded by ramp-up and ramp-down values. The ramp-up and ramp-down values may be given, e.g., by a manufacturer of an energy generator. The constraint of equation (18) describes that the status of a generator is on or off and that the quantity of energy generated is a positive number.

Constraints of equations (19)-(24) are associated with energy storage system. The constraint of equation (19) describes energy balance of the energy store: e.g., the total energy accumulated at time t is accounted by the energy accumulated at previous time, energy charged or stored at time t, and energy discharged at time t considering self-discharge efficiency factor. The constraint of equation (20) describes that the amount of energy discharged is not greater than the amount that is accumulated. The constraint of equation (21) describes that the amount of energy charged is bounded by minimum and maximum rates. The constraint of equation (22) describes that energy discharge capacity is bounded by minimum and maximum values. The constraint of equation (23) describes that charged or accumulated energy is bounded by minimum and maximum values. The constraint of equation (23) describes that the status of an energy storage system is on or off and that the quantity of energy stored and discharged is a positive number. The minimum and maximum values may be given by a manufacturer of an energy storage system.

In one embodiment, the optimal control problem above may be formulated as a MINLP problem, e.g., because of the non-linear expression of the thermal behavior modeled (Eq. 9 and 10), which includes sigmoid activation functions, in artificial neural network. Solving the MINLP problem is usually difficult, and one way to simplify the problem is to approximate the MINLP to MILP by linearizing the sigmoid function. In this method, Eq. 9 and 10 are reformulated to a MILP, which may be solved using a variety of methods, depending on its size. One way to solve the MILP problem is with the IBM-ILOG CPLEX solver.

FIG. 1 is a diagram illustrating an optimized demand response control of HVAC system with on-site energy storage system and on-site energy generation system in one embodiment of the present disclosure. The total energy used by an HVAC system at time t (102) may be expressed as a function of control variables (e.g., set point temperature) and energy supplied to the HVAC system at time t (108). The energy supplied to the HVAC system 108 is expressed in terms of decision variables. Examples of decision variables may include, power purchased from grid at time t, power charge rate, power discharge rate and power generated at time t. For example, power may include purchased grid electricity 104, which may be directly used for an HVAC system 106. Purchased grid electricity may be also stored or accumulated as shown at 112. The amount of stored energy may depend on charge efficiency 110 and self-discharge rate of an energy storage system. The stored electricity may be discharged subject to discharge efficiency 114 of the energy storage system, to be supplied as part of the energy supplied to HVAC 108. Energy supplied to HVAC 108 also may be sourced from generated energy. For example, another source of power, natural gas 116 may be converted to power 120 subject to the efficiency factor of a generator 118 and supplied to the HVAC system as part of the energy supplied to HVAC 108.

A methodology of the present disclosure in one embodiment shown in FIG. 1 may determine simultaneously both the amounts of energy sources to be supplied and the control variables (e.g., temperatures to set to) over a future period of time that optimize the cost of supplying the energy or power and the desired comfort level for that future period of time. For example, using the objective function of equation (8), the methodology of the present disclosure in one embodiment finds optimal values for control variable profile u(t) (e.g., set point, $T_{t,z}^{sp}$) and decision variables p(t), $s_t^{in}$ (charge rate), $s_t^{out}$ (discharge rate) and g(t), (energy generation) that minimize the objective function of equation (8) subject to a set of constraints, e.g., described above in equations (9)-(10), (14), (16)-(24).

In the objective function of equation (8), the first term represents a cost of buying power (e.g., gas and electricity), the second term represents a gas emission cost, the third terms represents occupant comfort matrix, e.g., expressed as a deviation from the desired temperature level, and the fourth and fifth terms represents an operational cost for running energy storage system and energy generation system.

Figure 2:
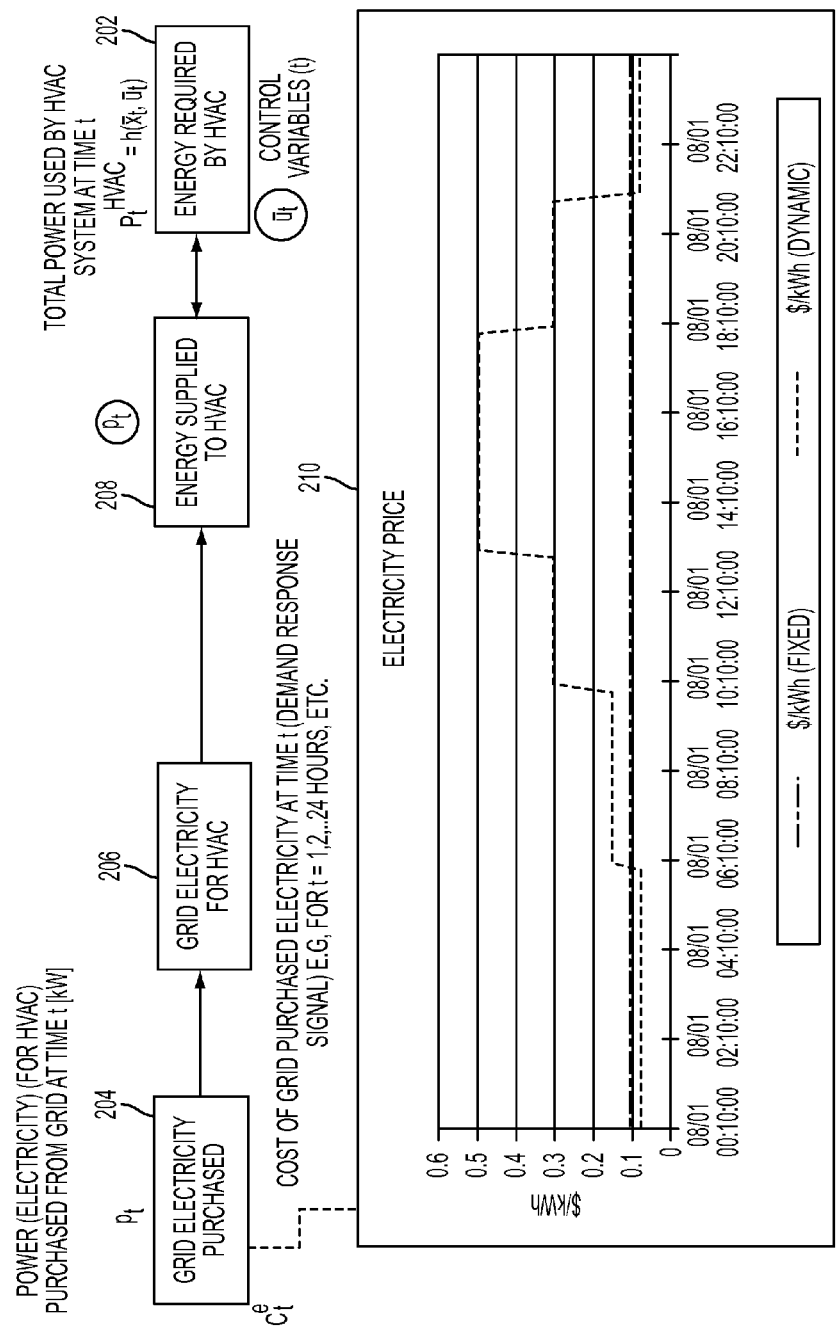
FIG. 2 is a diagram illustrating an optimized demand response control of HVAC system in another embodiment of the present disclosure.

FIG. 2 is a diagram illustrating an optimized demand response control of HVAC system in another embodiment of the present disclosure. The total energy used by an HVAC system at time t (202) may be expressed as a function of control variables (e.g., set point temperature) and energy supplied to the HVAC system at time t (208). The energy supplied to the HVAC system 208 is expressed in terms of decision variables. In this embodiment, examples of decision variables may include, power purchased from grid at time t. For example, power may include purchased grid electricity 204, which may be used for an HVAC system 206. Cost of grid purchased electricity may depend on demand response signal at time t, for example, as shown at 210.

A methodology of the present disclosure in one embodiment shown in FIG. 2 may determine simultaneously both the amount of energy source to be supplied and the control variables (e.g., set point temperatures) over a future period of time that optimize the cost of supplying and the desired comfort level for that future period of time. For example, using the objective function:

$$\min_{p_t, T_{t,z}^{sp}} \sum_{t \in T} \left[ \alpha_1 C_t^e p_t + \alpha_2 \sum_{z \in Z} \frac{\|T_{t,z}^{zone^*} - f(\cdot)\|^2}{2} \right] \quad (25)$$

the methodology of the present disclosure in one embodiment finds optimal values for control variable profile u(t) (e.g., set point, $T_{t,z}^{sp}$) and decision variable p(t) (e.g., purchased grid electricity) that minimize the objective function subject to a set of constraints, e.g., described above in equations (9)-(10) and (11). In the object function of equation (25), the first term represents a cost of buying power (e.g., electricity) and the second term represents occupant comfort matrix, e.g., expressed as a deviation from the desired temperature level.

Figure 3:
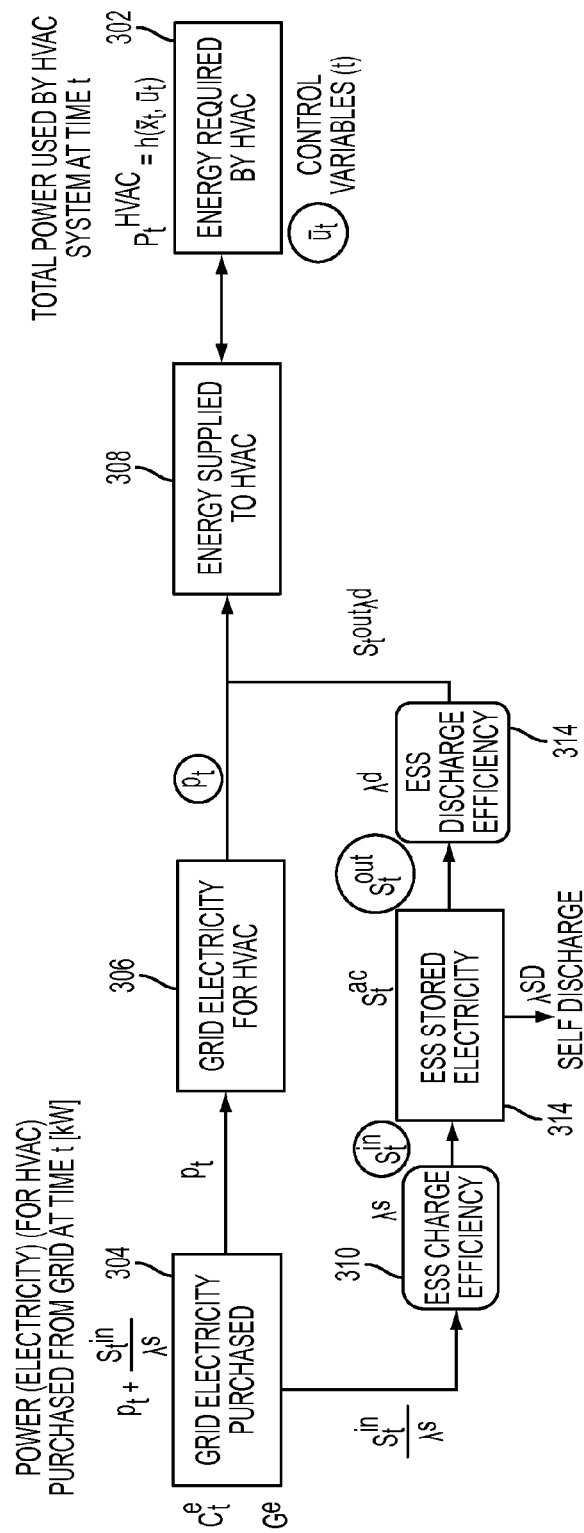
FIG. 3 is a diagram illustrating an optimized demand response control of HVAC system with on-site energy storage system in one embodiment of the present disclosure.

FIG. 3 is a diagram illustrating an optimized demand response control of HVAC system with on-site energy storage system in one embodiment of the present disclosure. The total energy used by an HVAC system at time t (302) may be expressed as a function of control variables (e.g., set point temperature) and energy supplied to the HVAC system at time t (308). The energy supplied to the HVAC system 108 is expressed in terms of decision variables. In this embodiment, examples of decision variables may include, power purchased from grid at time t, power storage system's charge rate and discharge rate. For example, power may include purchased grid electricity 304, which may be directly used for an HVAC system 306. Purchased grid electricity may be also stored as shown at 312. The amount of stored energy may depend on charge efficiency 110 of the power or energy storage system. The stored electricity may be discharged subject to discharge efficiency 114 of the power or energy storage system, to be supplied as part of the energy supplied to HVAC 308.

A methodology of the present disclosure in one embodiment shown in FIG. 3 may determine simultaneously both the amounts of energy sources to be supplied and the control variables (e.g., temperatures to set to) over a future period of time that optimize the cost of supplying and desired comfort level for that future period of time. For example, using the objective function:

$$\min_{p_t, s_t^{in}, s_t^{out}, T_{t,z}^{sp}} \sum_{t \in T} \left[ \alpha_1 C_t^e \left( p_t + \frac{s_{in}}{\lambda^s} \right) + \alpha_3 \sum_{z \in Z} \frac{\|T_{t,z}^{zone^*} - f(\cdot)\|^2}{2} + \alpha_5 S_t^s v_t \right] \quad (26)$$

the methodology of the present disclosure in one embodiment finds optimal values for control variable profile u(t) (e.g., set point, $T_{t,z}^{sp}$) and decision variables p(t), $s_t^{in}$ (charge rate) and $s_t^{out}$ (discharge rate) that minimize the objective function subject to a set of constraints, e.g., described above in equations (9)-(10), (12), (19)-(24). In the object function of equation (26), the first term represents a cost of buying power (e.g., electricity), the second term represents occupant comfort matrix, e.g., expressed as a deviation from the desired temperature level, and the third term represents an operational cost of running an energy storage system.

Figure 4:
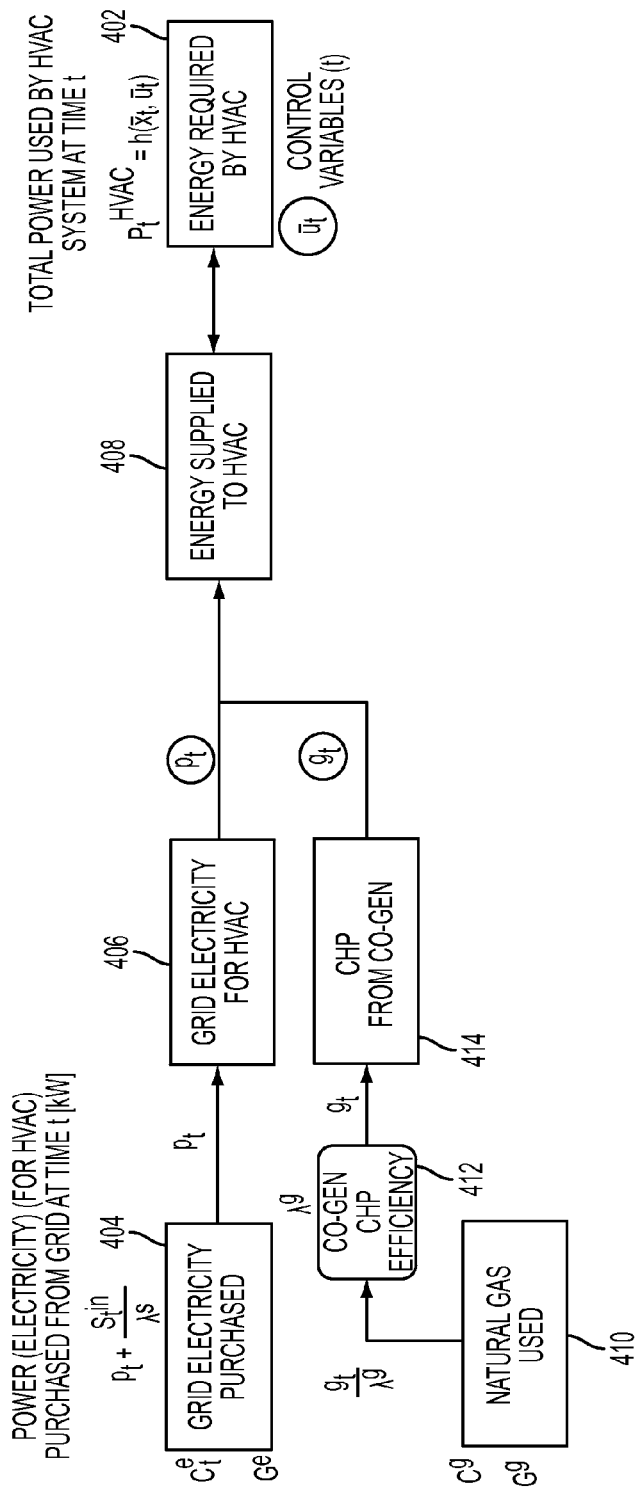
FIG. 4 is a diagram illustrating an optimized demand response control of HVAC system with on-site energy generation system in one embodiment of the present disclosure.

FIG. 4 is a diagram illustrating an optimized demand response control of HVAC system with on-site energy generation system in one embodiment of the present disclosure. In this embodiment, the total energy used by an HVAC system at time t (402) may be expressed as a function of control variables (e.g., set point temperature) and energy supplied to the HVAC system at time t (408). The energy supplied to the HVAC system 408 is expressed in terms of decision variables. Examples of decision variables in this embodiment may include, power purchased from grid at time t and power generated at time t. For example, power may include purchased grid electricity 404, which may be directly used for an HVAC system 406. Energy supplied to HVAC 408 also may be sourced from generated energy. For example, another source of power, natural gas 410 may be converted to power 414 subject to an efficiency factor of a generator 412 and supplied to the HVAC system as part of the energy supplied to HVAC 408.

A methodology of the present disclosure in one embodiment shown in FIG. 4 may determine simultaneously both the amounts of energy sources to be supplied and the control variables (e.g., set point temperatures) over a future period of time that optimize the cost of supplying energy and the desired comfort level for that future period of time. For example, using the objective function:

$$\min_{p_t, g_t, T_{t,z}^{sp}} \sum_{t \in T} [\alpha_1 \left( C_t^e p_t + C^g \frac{g_t}{\lambda^g} \right) + \qquad (27)$$

$$\alpha_2 \left( G^e p_t + G^g \frac{g_t}{\lambda^g} \right) + \alpha_3 \sum_{z \in Z} \frac{\|T_{t,z}^{zone*} - f(\cdot)\|^2}{2} + \alpha_4 S_t^g \mu_t]$$

the methodology of the present disclosure in one embodiment finds optimal values for control variable profile u(t) (e.g., set point, $T_{t,z}^{sp}$) and decision variables p(t) and g(t) (energy generation amount), that minimize the objective function of equation (27) subject to a set of constraints, e.g., described above in equations (9)-(10), (13), (16)-(18).

In the object function of equation (27), the first term represents a cost of buying power (e.g., gas and electricity), the second term represents a gas emission cost, the third terms represents occupant comfort matrix, e.g., expressed as a deviation from the desired temperature level, and the fourth term represents an operational cost of running an energy generation system.

The objective functions described above in equations (8), (25)-(27) used set point temperature as an example of a control variable. Other examples of control variables that may be determined using the objective functions may include supply temperature and supply flow rate of AHU.

Figure 5:
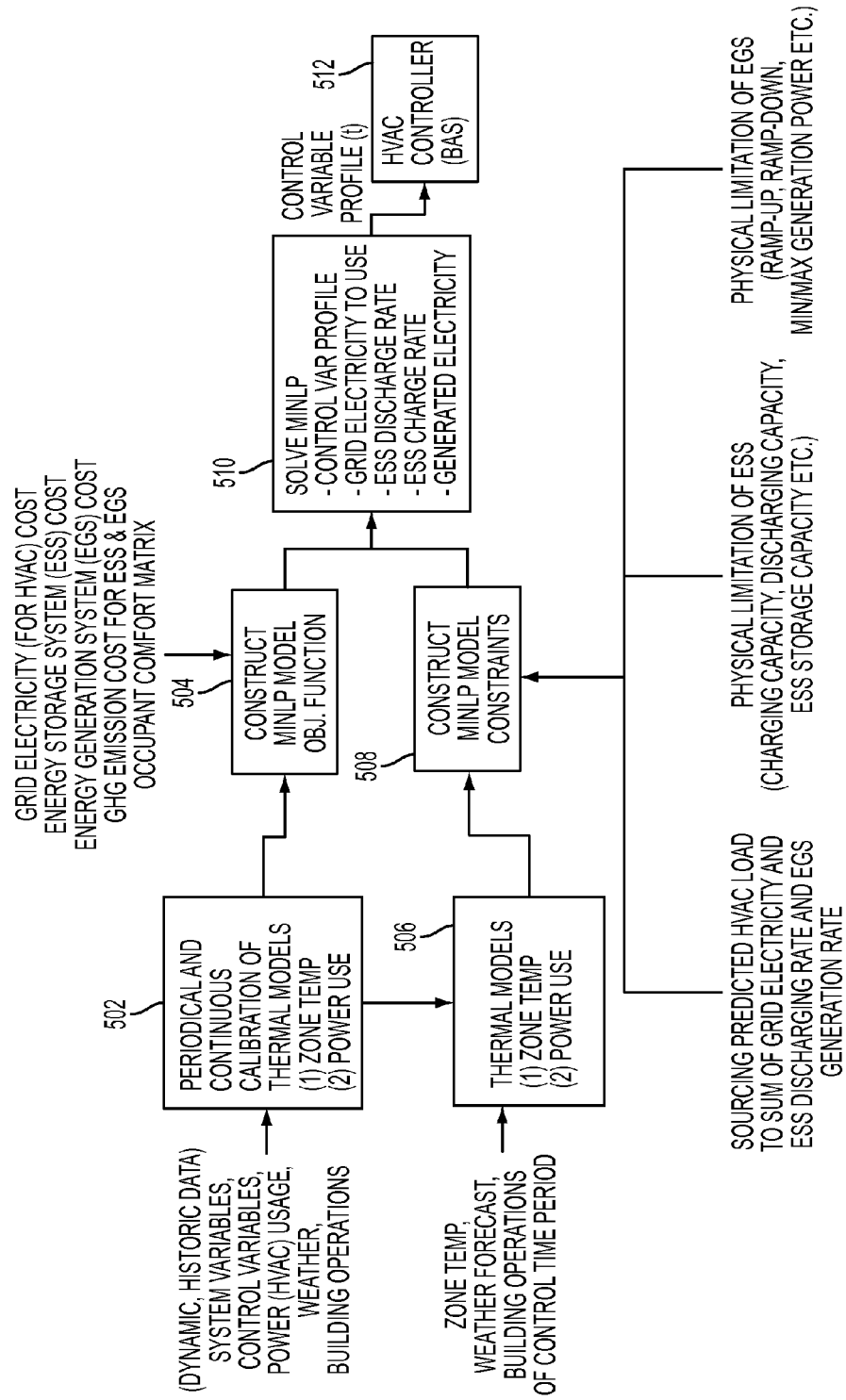
FIG. 5 is a diagram illustrating an overview of an HVAC system control integrated with demand response, on-site energy storage system and/or on-site energy generation system in one embodiment of the present disclosure.

FIG. 5 is a diagram illustrating an overview of an HVAC system control integrated with demand response, on-site energy storage system and on-site energy generation system in one embodiment of the present disclosure. At 502, the thermal behavior models for zone temperature (e.g., described above with reference to equations (1)-(3) and formulated as a constraint in equation (9)) and power usage (e.g., described above with reference to equations (4)-(5) and formulated as a constraint in equation (10)) may be periodically calibrated in a continuous manner. Dynamic and historical data for system variables, control variables, power (HVAC) usage, weather data, and building operations data may be collected or received to calibrate the thermal model. Dynamic and historical data here refers to a time series data, e.g., data received over time, e.g., 15 minute interval data for past 4 weeks.

At 504, an objective function may be constructed, e.g., as a mixed-integer non-linear programming (MINLP) problem. The objective function in one embodiment of the present disclosure may take into consideration a grid electricity for HVAC cost, energy storage system (ESS) cost, energy generation system (EGS) cost, greenhouse gas (GHG) emission cost of ESS and ESG, and occupant comfort matrix (factors or variables associated with providing comfort to occupant, e.g., comfortable level of temperature). For example, the objective function may be formulated as equation (8), equation (25), equation (26) or equation (27).

At 506, the calibrated thermal models of 502 are utilized to generate predicted or forecasted values for zone temperature and power usage over time (e.g., over a control time period) given the values for zone temperature, weather data, and building operations data. The given values for zone temperature may include zone temperature data from previous time periods. The given values for weather data may include ambient temperature from previous time periods and/or the current time period. The given values for building operations data may include calendar data such a day of the week, time of the day, holiday that provide information as to whether the building is operating or not. As an example, at 506, for every interval of time (e.g., every 10 minutes) for the control time period (e.g., the next 24 hours), a zone temperature and power usage may be predicted.

At 508, MINLP model constraints are constructed based on the predicted values. In addition, the modeled constraints may include sourcing the predicted HVAC load (e.g., computed according to equation (10) at 506) as a sum of grid electricity, ESS discharging rate and EGS generation rate, e.g., as expressed in equations (11)-(14), for example, based on which objective function is being constructed. The modeled constraints may also include physical limitations of ESS, e.g., charging capacity, discharging capacity, ESS storage capacity, etc., e.g., as expressed in equations (19)-(24), for example, based on which objective function is being constructed. The modeled constraints may further include physical limitations of EGS, e.g., ramp-up, ramp-down, min/max generation power, etc., as expressed in equations (16)-(18), for example, based on which objective function is being constructed.

At 510, MINLP is solved using the objective function constructed at 504 and constraints constructed at 508 to determine a control variable profile (e.g., temperature set point at every interval of time over the control period for every zone being considered, e.g., $T_{t,z}^{zone}$), energy to use (e.g., grid electricity to use, $p_t$) at the corresponding every interval of time over the control period for every zone being considered. Based on the objective function, stored energy to use (e.g., ESS discharge rate, e.g., $s_t^{in}$) at the corresponding every interval of time over the control period for every zone being considered, energy to store (e.g., ESS charge rate, e.g., $s_t^{out}$), and/or energy to generate and use (e.g., generated electricity, e.g., $g_t$) at the corresponding every interval of time over the control period for every zone being considered, may be also determined.

At 512, the control variable profile may be transmitted or fed into an HVAC controller, e.g., of a building automation system (BAS). Signals that include the data of the control variable profile, e.g., may be transmitted to the HVAC controller. The control variable profile, for example, may include a temperature value (temperature set point) for every interval of time that the HVAC controller may set in order to achieve the desired target zone temperature for that control period of time at the same time minimizing the various costs described in the objective function. For instance, responsive to receiving the control variable profile signals, the HVAC controller may set the temperatures at the corresponding time intervals.

In the scenario in which amount of energy to store (charge) and used (discharge) is computed, a signal to store and discharge energy may be transmitted to an energy storage system with the appropriate data for instructing or controlling the energy storage system accordingly. In the scenario in which energy is generated and used, a signal to generate energy and use the generated energy may be transmitted to an energy generation system with appropriate data for instructing or controlling the energy generation system accordingly.

In one aspect, the system shown in FIG. 5 may function as a feedback control system loop, in which the temperature set by the HVAC controller 512 affects the control and decision variables, which influence the thermal behavior of the zones in the building, and the results of the thermal behavior of the building are in turn used to recalibrate the thermal models at 502, which are used to predict another set of zone temperatures and power usage at 506, used as constraints in 508.

Figure 6:
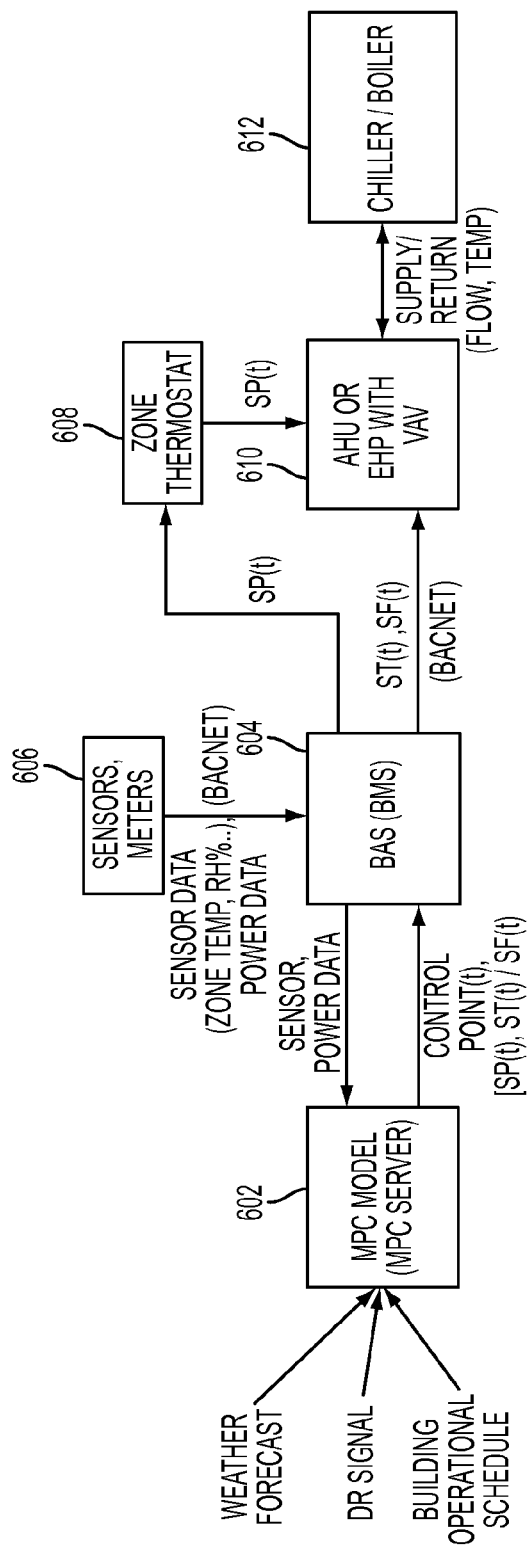
FIG. 6 is a diagram illustrating a control flow for controlling HVAC system by integrating it with a demand response, on-site energy storage system and/or on-site energy storage system in one embodiment of the present disclosure.

FIG. 6 is a diagram illustrating a control flow for controlling HVAC system by integrating it with a demand response, on-site energy storage system and/or on-site energy storage system in one embodiment of the present disclosure. BACnet is a communications protocol for building automation and control networks. It is an American Society of Heating, Refrigerating and Air-Conditioning Engineers (ASHRAE), American National Standards Institute (ANSI), and International Organization for Standardization (ISO) standard protocol. An MPC server 602 incorporates functionalities of an MPC model described above. For example, MPC server 602 may perform the methodologies described above with respect to reference items 502, 504, 506, 508 and 510 in FIG. 5, and may determine among others one or more control variables, e.g., temperature set point, supply temperature of AHU, supply flow rate of AHU, based on input data such as weather data and building operational schedule (e.g., described with respect to FIG. 5 at 506) and demand response signal (e.g., described with respect to FIG. 5 at 504). The MPC server 602 may be implemented on a processor including memory. The MPC server 602 sends the determined values, e.g., one or more of temperature set point, supply temperature of AHU, or supply flow rate of AHU to a controller (e.g., building automation system controller (BAS)) 604 for controlling a building's HVAC system (610, 612). The MPC server 602 may also receive data such as historic and/or current zone temperature data, past and/or current power usage data, past and/or current temperature set point data from the BAS controller 604. This data may be used by the MPC server 602 in recalibrating the thermal models, e.g., zone temperature and power usage models, e.g., shown at 502 in FIG. 5. The controller 604 may receive information such as the zone temperature data and power usage data from one or more sensors and/or one or more meters 606. For instance, the controller 604 may be connected to at least a sensor or a meter or both. The controller 604 may be connected to multiple of those sensors, meters or both.

Responsive to receiving one or more determined control variables from the MPC server 602, the BAS controller 604 may send signals to devices to control the devices according to the values of the control variables. For instance, the BAS controller 604 may send control signals indicating temperature set points (e.g., $T_{t,z}^{sp}$) over time according to the determined temperature set point control profile, to a zone thermostat 608, to set the zone thermostat 608 at the specified temperature at specified time interval. If the control variable determined at the MPC server 602 includes supply temperature (e.g., $T_{t,z}^{sys}$) of AHU or supply flow rate (e.g., $\dot{m}_{t,z}^{sys}$) of AHU, the BAS controller 604 may send control signals to an HVAC system, e.g., an AHU 610 or electric heat pump (EHP) with variable air volume (VAV) or a like device to blow air at the determined temperature or flow rate. An AHU 610 or a like device may be connected to a zone thermostat 608 for receiving temperature data. An AHU 610 or a like device may be also connected to a chiller or boiler 612 of the HVAC system.

Figure 7:
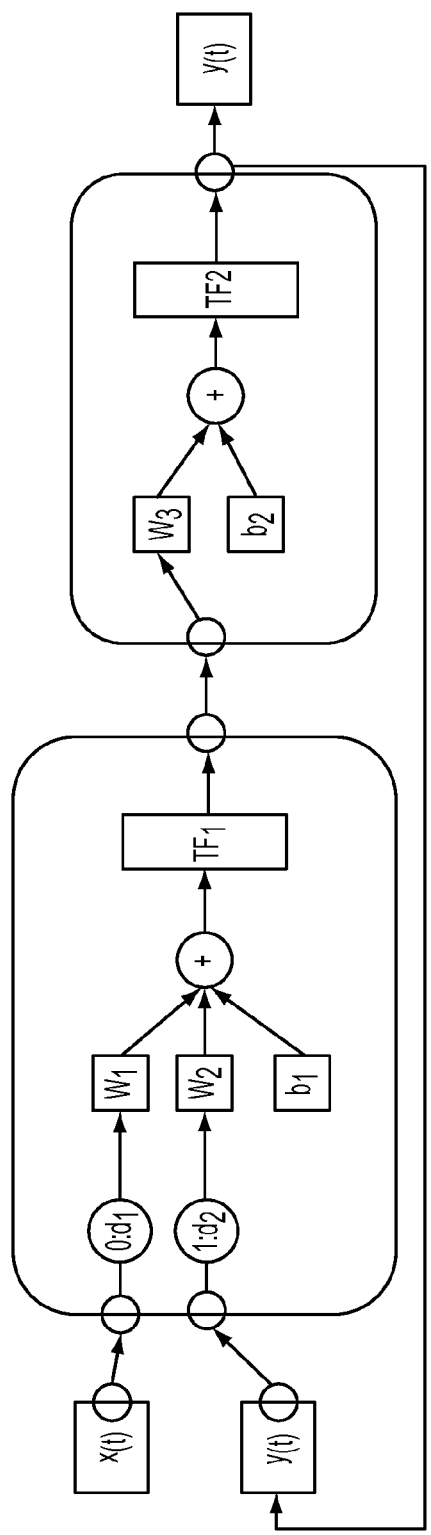
FIG. 7 is a diagram illustrating a structure of a non-linear autoregressive with external input (NARX) neural network used in one embodiment of the present disclosure to model thermal behavior.

FIG. 7 is a diagram illustrating a structure of a non-linear autoregressive with external input (NARX) neural network used in one embodiment of the present disclosure to model thermal behavior. An embodiment of the present disclosure models thermal behavior of a building zone by a nonlinear autoregressive neural network (NARNET). FIG. 7 shows a feed-forward time delay neural network, which maps input data to an output, with additional external input, and illustrates the algebraic equation (6). The methodology of the present disclosure in one embodiment may consider three types of activation functions (for example, shown at $TF_1$ in the figure): hyperbolic tangent, symmetric saturated liner transfer function and hard-limit transfer function. $TF_2$ is a linear function in one embodiment.

In one aspect, optimal control problem of the present disclosure may be formulated as a mixed-integer non-linear programming (MINLP) model. The optimal control problem may be solved to minimize the total energy costs of powering HVAC system and corresponding GHG emission and the cost of operating on-site energy storage system (ESS) and on-site energy generation (EGS) system, and satisfy thermal comfort of building occupants within the physical limitation of HVAC equipment and physical limitation of on-site energy storage system and on-site energy generators. The optimal control problem may consider dynamic demand response signal (dynamic time of the day pricing), on-site energy storage system and on-site energy generation system.

As described above, a methodology of the present disclosure in one embodiment may optimally decide control profiles of an HVAC system and how the energy or power (load) needed by the HVAC system is sourced. A methodology of the present disclosure in one embodiment may model an energy load (e.g., power usage) with a machine learning technique such as a neural network technique, and calibrate the model dynamically and continuously based on dynamic profiles of sensor data (and/or meter data). In one aspect, examples control variables in the present disclosure in an HVAC system may include thermostat set point, supply temperature of air handling unit (AHU), and supply flow of AHU. A methodology of the present disclosure in one embodiment may model a gas-fired co-generator in determining a control profile of an HVAC system. A methodology of the present disclosure in one embodiment may use an on-site generation of carbon-emission data (e.g., carbon generated by on-site gas-fired generators which produces electricity that is used to power the HVAC system) in determining a control profile of an HVAC system. In one aspect, a methodology of the present disclosure in one embodiment generates carbon-emission data associated with gas-fired on-site generated energy, and therefore need not depend on a manufacturer or utility company to provide such information.

Figure 8:
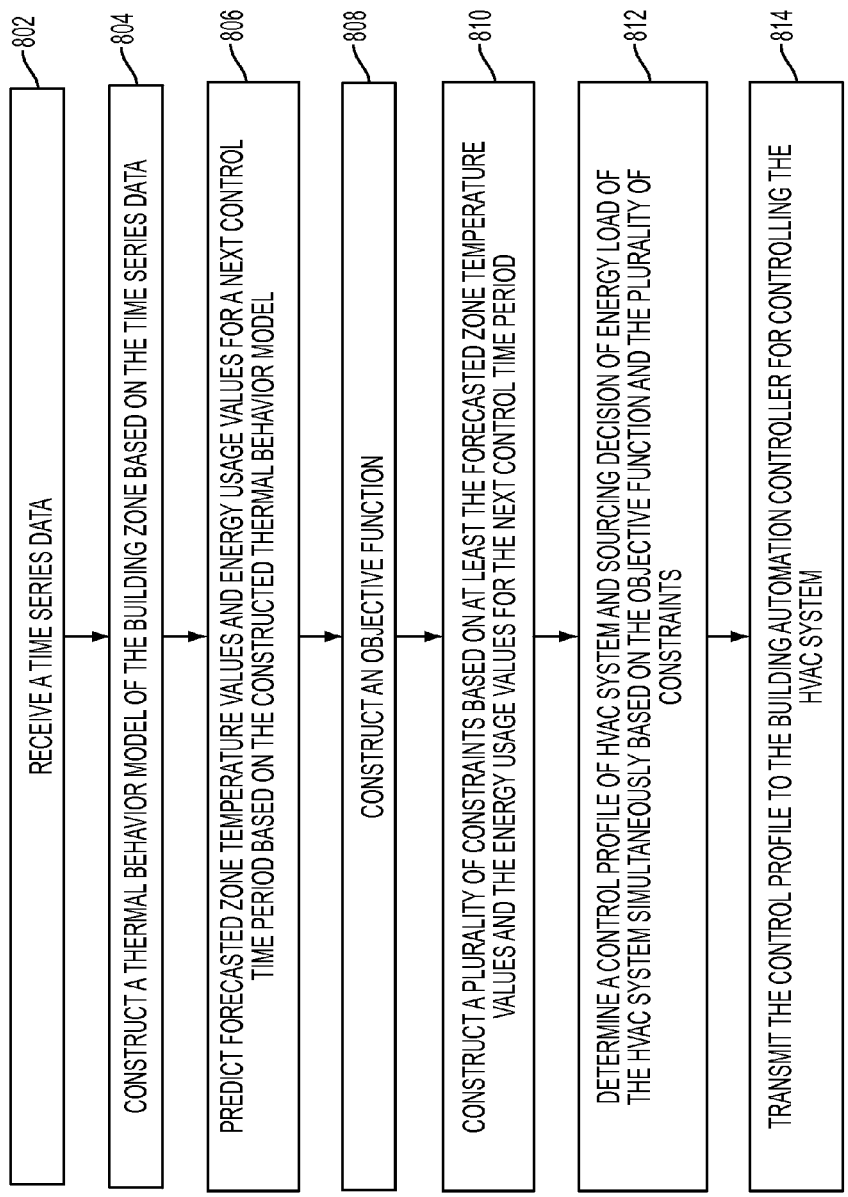
FIG. 8 is a flow diagram illustrating a method of controlling an HVAC system in one embodiment of the present disclosure.

A methodology of the present disclosure in one embodiment provides for a demand response based Model Predictive Control (MPC) framework that computes control profiles of an HVAC system that minimize costs, considering grid purchased energy at dynamic pricing, on-site stored energy and/or on-site generated energy, GHG emission and thermal comfort of occupants. FIG. 8 is a flow diagram illustrating a method of controlling an HVAC system in one embodiment of the present disclosure. At 802, a time series data is received. The time series data includes at least a zone temperature data associated with a building zone, energy usage data associated with the building zone, building operations data associated with the building zone and ambient temperature data. In one embodiment, at least some of the time series data are received from a building automation controller that is connected to one or more sensors and/or one or more meters in a building. For instance, the building automation controller may be connected to at least a sensor or a meter or both a sensor and a meter.

At 804, a thermal behavior model of the building zone is constructed based on the time series data. The thermal behavior model may include a zone temperature model and energy usage model. In one embodiment, the thermal behavior model is modeled by a nonlinear autoregressive neural network. At 806, forecasted zone temperature values and energy usage values for a next control time period is predicted based on the constructed thermal behavior model.

At 808, an objective function is constructed. In one embodiment, an objective function may be constructed based on a dynamically priced grid energy cost and occupant comfort matrix, and energy storage system cost and associated energy storage system operational cost. In another embodiment, an objective function may be constructed based on a dynamically priced grid energy cost and occupant comfort matrix, and energy generation system cost and associated green house emission cost and associated energy generation system operational cost. Yet in another embodiment, an objective function may be constructed based on a dynamically priced grid energy cost and occupant comfort matrix, and energy storage system cost and associated energy storage system operational cost, and energy generation system cost and associated green house emission cost and associated energy generation system operational cost.

At 810, a plurality of constraints is constructed based on at least the forecasted zone temperature values and energy usage values for the next control time period.

At 812, a control profile of HVAC system and sourcing decision of energy load of the HVAC system are determined simultaneously based on the objective function and the plurality of constraints. In another embodiment, a control profile of HVAC system, sourcing decision of energy load of the HVAC system and an energy storage decision may be determined simultaneously based on the objective function and the plurality of constraints.

At 814, the control profile may be transmitted to the building automation controller for controlling the HVAC system in accordance with the control profile data. In one embodiment, the control profile may include a series of temperature set points over the next control time period for the building automation controller to set one or more zone thermostats. In another embodiment, the control profile may include a series of supply temperature of AHU over the next control time period for the building automation controller to set an HVAC device. Yet in another embodiment, the control profile may include a series of supply flow rate of AHU over the next control time period for the building automation controller to set an HVAC device.

In one embodiment, the sourcing decision of energy load may include sourcing the energy load of the HVAC system from purchased energy, stored energy and generated energy. In another embodiment, the sourcing decision of energy load may include sourcing the energy load of the HVAC system from purchased energy and stored energy. Yet in another embodiment, the sourcing decision of energy load may include sourcing the energy load of the HVAC system from purchased energy and generated energy. The sourcing decision of energy load may include amount of energy to use from which source and at what time interval over the next control time period. The energy storage decision in one embodiment may include amounts of energy to store at which intervals of time over the next control time period. A sourcing decision associated with energy storage and discharge of stored energy may be transmitted to an energy storage system. A sourcing decision associated with energy generation and using generated energy may be transmitted to an energy generation system.

In one aspect, the control profile of HVAC system and the sourcing decision of energy load of the HVAC system may be determined for each of multiple building zones simultaneously based on the objective function and the plurality of constraints.

The method of the present disclosure in one embodiment may compute a cost effective control profile of an HVAC system and a sourcing decision of the energy load of the HVAC system that minimize the total energy costs considering demand response signals and one or more of on-site energy storage system and on-site energy generation system while satisfying thermal comfort of building occupants, a physical limitation of HVAC equipment, a physical limitation of energy storage system and a physical limitation energy generation system by modeling the dynamics of zone temperature and power consumption, adaptively calibrating the models using the dynamics of sensor data (and/or meter data), and solving the model-predictive optimal control problem using an objective function and a set of constraints. An objective function of the cost effective control model may include grid electricity (for operating HVAC) cost, one or more of on-site energy storage system cost and on-site energy generation system cost, greenhouse gas (GHG) emission cost for one or more of grid electricity and on-site energy generation fuel, and occupant comfort matrix. The cost effective control problem may be solved to compute the amount of electricity from grid to be used, the amount of energy discharged from energy storage system and/or the amount of energy charged to the on-site energy storage system and/or the amount of on-site generated electricity.

Figure 9:
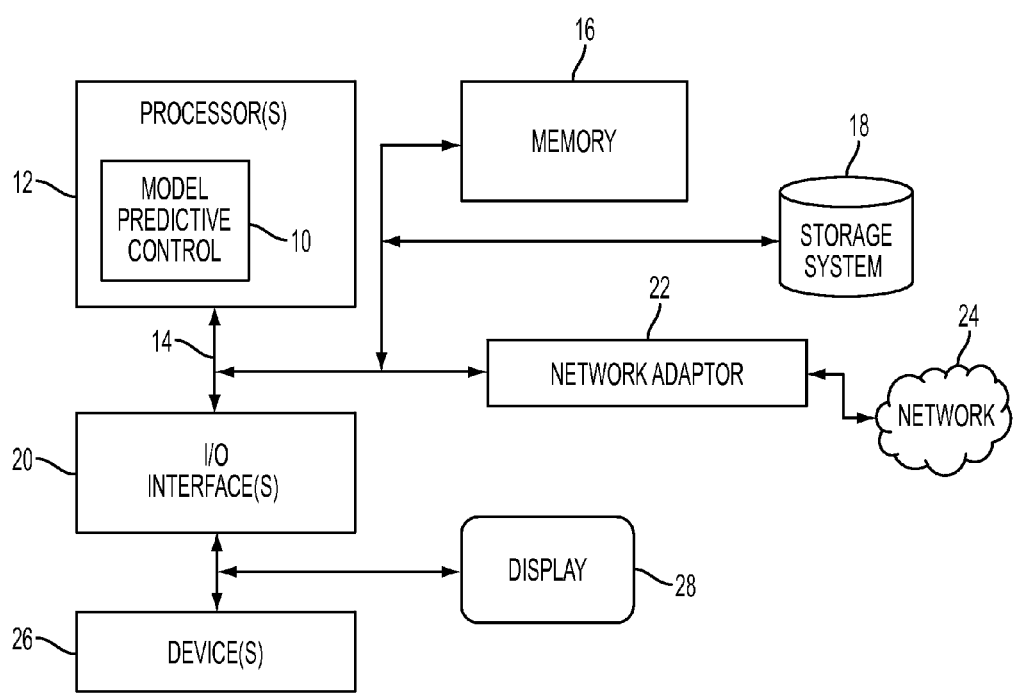
FIG. 9 illustrates a schematic of an example computer or processing system that may implement an HVAC control system in one embodiment of the present disclosure.

FIG. 9 illustrates a schematic of an example computer or processing system that may implement a HVAC control system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of controlling an HVAC system, comprising:
receiving a time series data of at least a zone temperature associated with a building zone, energy usage associated with the building zone, building operations associated with the building zone and ambient temperature, at least some of the time series data received from a building automation controller that is connected to at least a sensor or a meter or both in a building;
constructing a thermal behavior model of the building zone based on the time series data;
predicting based on the constructed thermal behavior model at least forecasted zone temperature values and energy usage values for a next control time period;
constructing an objective function based on at least a dynamically priced grid energy cost and associated greenhouse gas emission, occupant comfort matrix, and one or more of:
  energy storage system cost and associated operational cost, and
  energy generation system cost and associated green house emission cost and associated operational cost;
constructing a plurality of constraints based on at least the forecasted zone temperature values and energy usage values for the next control time period;
determining a control profile of the HVAC system and sourcing decision of energy load of the HVAC system simultaneously based on the objective function and the plurality of constraints; and
transmitting the control profile to the building automation controller for controlling the HVAC system in accordance with the control profile.

2. The method of claim 1, wherein the thermal behavior model comprises a zone temperature model and energy usage.

3. The method of claim 1, wherein the thermal behavior model is modeled by a nonlinear autoregressive neural network.

4. The method of claim 1, wherein the control profile comprises a series of temperature set points of a zone thermostat over the next control time period for the building automation controller to set one or more zone thermostats.

5. The method of claim 1, wherein the control profile comprises a series of supply temperature of an AHU over the next control time period for the building automation controller to set an HVAC device.

6. The method of claim 1, wherein the control profile comprises a series of supply flow rate of an AHU over the next control time period for the building automation controller to set an HVAC device.

7. The method of claim 1, wherein the sourcing decision of energy load comprises sourcing the energy load of the HVAC system from purchased energy, stored energy and generated energy, sourcing the energy load of the HVAC system from purchased energy and stored energy, or sourcing the energy load of the HVAC system from purchased energy and generated energy, wherein the sourcing decision of energy load comprises amount of energy to use from which source and at what time interval over the next control time period.

8. The method of claim 1, wherein the determining a control profile of HVAC system and sourcing decision of energy load of the HVAC system comprises determining the control profile of HVAC system, the sourcing decision of energy load of the HVAC system and an energy storage decision simultaneously based on the objective function and the plurality of constraints.

9. The method of claim 8, wherein the energy storage decision comprises amounts of energy to store at which intervals of time over the next control time period.

10. The method of claim 1, wherein the control profile of HVAC system and the sourcing decision of energy load of the HVAC system are determined for each of multiple building zones simultaneously based on the objective function and the plurality of constraints.

11. A system for controlling an HVAC system, comprising:
a processor;
the processor operable to receive a time series data of at least a zone temperature associated with a building zone, energy usage associated with the building zone, building operations associated with the building zone and ambient temperature,
the processor operable to receive at least some of the time series data from a building automation controller that is connected to at least a sensor or a meter or both in a building,
the processor further operable to construct a thermal behavior model of the building zone based on the time series data,
the processor further operable to predict based on the constructed thermal behavior model at least forecasted zone temperature values and energy usage values for a next control time period,
the processor further operable to construct an objective function based on at least a dynamically priced grid energy cost and associated greenhouse gas emission, occupant comfort matrix, and one or more of (i) energy storage system cost and associated operational cost, and (ii) energy generation system cost and associated green house emission cost and associated operational cost,
the processor further operable to construct a plurality of constraints based on at least the forecasted zone temperature values and energy usage values for the next control time period,
the processor further operable to determine a control profile of the HVAC system and sourcing decision of energy load of the HVAC system simultaneously based on the objective function and the plurality of constraints, and
the processor further operable to transmit the control profile to the building automation controller for controlling the HVAC system in accordance with the control profile.

12. The system of claim 11, wherein the thermal behavior model comprises a zone temperature model and energy usage.

13. The system of claim 11, wherein the thermal behavior model is modeled by a nonlinear autoregressive neural network.

14. The system of claim 11, wherein the control profile comprises:
a series of temperature set points over the next control time period for the building automation controller to set one or more zone thermostats;
a series of supply temperature of an air handling unit over the next control time period for the building automation controller to set an HVAC device; or
a series of supply flow rate of the air handling unit over the next control time period for the building automation controller to set an HVAC device; or
combinations thereof.

15. The system of claim 11, wherein the sourcing decision of energy load comprises sourcing the energy load of the HVAC system from purchased energy, stored energy and generated energy, sourcing the energy load of the HVAC system from purchased energy and stored energy, or sourcing the energy load of the HVAC system from purchased energy and generated energy, wherein the sourcing decision of energy load comprises amount of energy to use from which source and at what time interval over the next control time period.

16. The system of claim 11, wherein the processor further determines an energy storage decision simultaneously with the control profile of HVAC system and the sourcing decision of energy load of the HVAC system based on the objective function and the plurality of constraints.

17. The system of claim 16, wherein the energy storage decision comprises amounts of energy to store at which intervals of time over the next control time period.

18. The system of claim 11, wherein the control profile of HVAC system and the sourcing decision of energy load of the HVAC system are determined for each of multiple building zones simultaneously based on the objective function and the plurality of constraints.

19. A computer readable storage medium storing a program of instructions executable by a machine to perform a method of controlling an HVAC system, the method comprising:
receiving a time series data of at least a zone temperature associated with a building zone, energy usage associated with the building zone, building operations associated with the building zone and ambient temperature, at least some of the time series data received from a building automation controller that is connected to at least a sensor or a meter or both in a building;
constructing a thermal behavior model of the building zone based on the time series data;

predicting based on the constructed thermal behavior model at least forecasted zone temperature values and energy usage values for a next control time period;

constructing an objective function based on at least a dynamically priced grid energy cost and associated greenhouse gas emission, occupant comfort matrix, and one or more of:
  energy storage system cost and associated operational cost, and
  energy generation system cost and associated green house emission cost and associated operational cost;

constructing a plurality of constraints based on at least the forecasted zone temperature values and energy usage values for the next control time period;

determining a control profile of the HVAC system and sourcing decision of energy load of the HVAC system simultaneously based on the objective function and the plurality of constraints; and transmitting the control profile to the building automation controller for controlling the HVAC system in accordance with the control profile.

20. The computer readable storage medium of claim 19, wherein the determining a control profile of HVAC system and sourcing decision of energy load of the HVAC system comprises determining the control profile of HVAC system, the sourcing decision of energy load of the HVAC system and an energy storage decision simultaneously based on the objective function and the plurality of constraints.

* * * * *